Patented Aug. 25, 1936

2,051,910

UNITED STATES PATENT OFFICE 2,051,910

COPPER FUNGICIDES

Alwyn C. Sessions, New Brunswick, N. J., assignor to California Spray-Chemical Corporation, Berkeley, Calif., a corporation of Delaware No Drawing. Application April 4, 1934, Serial No. 719,040

12 Claims. (Cl. 167—16)

This invention relates to improvements in the composition of copper containing fungicidal preparations and more particularly of such copper preparations as include an appreciable proportion of silicate for its buffering and stabilizing action.

In my recently issued Patent No. 1,988,752, I have described a new copper complex ammonium silicate which under the trade name "Coposil" has now attained widespread commercial acceptance as a highly effective and entirely safe fungicide for use on even the most copper sensitive horticultural species.

In another copending application Serial No. 719,042 I have described a second new copper compound which is apparently a complex copper calcium silicate or possibly more exactly a copper calcium basic silicate. This complex is also a highly effective fungicide characterized by its simplicity of preparation, its safety, its low cost and its compatibility with a wide variety of the usual insecticidal sprays.

Both of these preparations appear to owe most of their highly desirable characteristics as well as their single obvious disadvantage to the same feature of their composition. Both derive their high degree of stability under conditions of use, i. e. their ability to remain insoluble in appreciable concentrations of acid, largely from the chemical buffering action of the appreciable quantities of silicate radical which they contain. Due also to their silicate content both of these materials when precipitated from aqueous solution come down as highly hydrophyllic gels which are very similar to the well known silicic acid gels both in their appearance and in their physical properties. One such property common to practically all hitherto known high silica gels is that of drying under most conditions to a hard, brittle, glassy solid. Both of my previously described fungicidal silicate containing copper compositions possess this property to an extent which is objectionable when it is desired to prepare and store them in a dry rather than a paste form. Such hard, glassy material is difficult to grind to the proper degree of fineness and when so ground gives a material the particles of which are dense, do not form good dusts for dry application, do not disperse readily for spray application and have a tendency to ball or cake together into objectionable hard lumps on long storage.

It is the object of this invention to provide a modification of the highly efficient copper-silicate fungicides which will cause them to dry in an amorphous or chalky form rather than as a glass.

It is a further object of this invention to produce a modified copper ammonium silicate or copper calcium silicate which retains all of the potency and the high degree of safety of the original compounds and which does not lose either of these properties to a substantial extent even on long storage.

While zinc in certain of its compounds has long been known to possess some fungicidal value, it by no means compares in potency with copper and appears only to have received attention and use on certain isolated crops so sensitive to copper injury as not to permit its use in the forms then available.

I have now discovered that when a portion of the copper in the complex copper-silicate fungicides is replaced by zinc, several desirable effects are realized without any apparent loss in the fungicidal effectiveness of the combination.

The most obvious such improvement resides in the physical form and properties of the precipitated complexes. When, for instance, 10–20% on an atomic basis, of the copper in "Coposil" as originally disclosed is substituted by zinc a substantial change in the form of the precipitate is effected and a rather surprising result in its action on drying is realized. The precipitate is somewhat more flocculent and while obviously still decidedly hydrophyllic, the characteristic silicic acid gel nature of the pure copper complex has been somewhat modified. The precipitate filters more readily and the filter cake dries to a chalk-like, easily ground material which is very different from the hard glassy product containing copper alone. This copper-zinc compound possesses a further advantage in that when dried and ground it gives a powder which is light and fluffy and thus admirably suited to application as a dust and is readily suspended for wet application. This powder does not tend to pack and cake undesirably on storage.

When a similar substitution of zinc for a part of the copper is made in the copper calcium silicate fungicidal material of my copending application entirely similar advantages are realized though possibly to a somewhat less degree.

A further advantage due to the inclusion of a proportion of zinc in either of these copper silicate complex compositions resides in the fact that their high degree of acid insolubility and hence their safety in subsequent application to delicate foliage is retained undiminished through long periods of storage in the dry powder form. This has been found not always to be the case with the material in which no zinc has been incorporated.

Still one further material advantage appears to reside in the copper-zinc compositions over the corresponding copper complexes. While it was to have been expected that the substitution of zinc, a horticulturally non-toxic material, for the extremely toxic copper would reduce the overall toxicity of the composition in proportion to the amount of such substitution it has been found that a considerably greater than proportional improvement is actually realized. In fact these copper-zinc compositions have now been tested under a wide variety of conditions in actual fungus control work and have been found to cause, on the average, a considerably lower degree of foliage injury than any hitherto known copper fungicide with which I am familiar.

The mechanism whereby the moderate proportions of zinc just discussed can effect such considerable changes both in the physical and chemical properties of these silicate complexes is not at all clear but may be due to a typical "double salt" formation between the zinc and copper atoms in the highly complex silicate structure.

Whatever the explanation of the effect observed, the method of preparing the copper-zinc complexes is substantially identical with the methods previously described for the corresponding copper compounds.

In the preparation of the ammonium complex copper and zinc salts, usually the sulfates, are mixed in the desired ratio in aqueous solution and are then precipitated by intermixing with an appropriate solution containing sodium or other soluble silicate and ammonia.

One composition which has been found to give highly satisfactory results was prepared as follows: 175 pounds of zinc sulfate, $ZnSO_4.7H_2O$, and 875 pounds of copper sulfate, $CuSO_4.5H_2O$ were dissolved in 2500 gallons of water, to this was slowly added 1400 pounds of sodium silicate solution containing 37.6% solids with a $Na_2O:SiO_2$ ratio of 1:3.22, and 280 pounds of 26° ammonia in solution in 2000 gallons of water, vigorous agitation being continued throughout the addition. The alkaline silicate solution is added until all of the copper and zinc have been precipitated which will occur at a pH between 6.8 and 8.2, usually at 7.0 to 7.2. The precipitate is then collected and washed substantially free from soluble salts after which it may either be preserved as a paste containing about 12.5% solids or dried and ground to a powder. The material thus prepared will contain 20–22% copper and 4–5% zinc.

In preparing the calcium containing complex 74 pounds of lime and 1500 pounds of sodium silicate solution containing 31.1% solids with a $Na_2O:SiO_2$ ratio of 1:3.86 are mixed with vigorous agitation in 250 gallons of water. To the suspension of insoluble calcium silicate thus formed may then be added a solution of 415 pounds of copper sulfate pentahydrate and 100 pounds of zinc sulfate heptahydrate in 100 gallons of water. After thorough agitation the precipitate is collected by any appropriate means and washed or not as occasion may demand. It will be found to contain copper, zinc, calcium and silicate in complex combination, the copper and zinc being substantially in an atomic ratio of 5:1.

While the two foregoing examples are of compositions which have been found to be highly satisfactory for the uses intended it will be readily apparent to one skilled in the art that rather wide variations in the proportions of the several components may be employed and may often be highly desirable.

I have found that an atomic ratio of zinc to copper of one to twenty is occasionally sufficient to effect the physical improvements in the complexes which have been described, but that a ratio of one to ten or even one to five will usually be found more satisfactory. An increase in zinc content even above this amount is, of course, possible but will usually be determined by the particular use for which the spray may be intended and to the relative cost of ingredients rather than by any additional improvement to be gained in the physical form of the material.

Having now described my invention and taught how it may be utilized, what I claim is:

1. A water insoluble complex copper-zinc silicate gel composition in which the ratio of zinc to copper is at least 1:20 and which is non-injurious when applied as a fungicide to growing vegetation.

2. A water insoluble hydrophyllic complex fungicide comprising copper and zinc as electropositive components and silicate as an electronegative component, the atomic ratio of zinc to copper being at least as great as 1:10 and the silicate constituting at least 10% of the total electronegative radicals combined with the zinc and copper.

3. A complex fungicidal composition comprising zinc and copper in atomic ratio of at least 1:10 and a silicate to the extent of at least 10% of the electronegative radicals combined with the zinc and copper said complex being characterized by being substantially insoluble in dilute acid, pH 6.0, and substantially non-injurious to verdant vegetation.

4. A water-insoluble complex copper-zinc, aluminum free, silicate gel composition in which the ratio of zinc to copper is at least 1:20.

5. A water-insoluble complex copper-zinc silicate gel composition which is devoid of the characteristic of base-exchange and in which the ratio of zinc to copper is at least 1:20.

6. A water-insoluble complex copper-zinc silicate gel composition in which the ratio of zinc to copper is at least 1:20 and which contains as the only other electropositive constituents an alkaline earth metal and/or ammonia.

7. In a method of preparing a fungicidally active composition the step of simultaneously precipitating copper and zinc from aqueous solution as components of a complex gel by the addition thereto of a solution of precipitating reagents in which at least 10% of the precipitating power is contributed by a silicate.

8. In a method of preparing a fungicidally active composition the step of simultaneously precipitating zinc and copper as components of a complex silicate gel through the intermixture of an aqueous solution of zinc and copper salts, in which the atomic ratio of zinc to copper is at least 1:10, with an alkaline earth silicate containing menstrum in which the silicate constitutes at least 10% of the electronegative components dissolved and/or suspended in water.

9. In a method of preparing a fungicidally active composition the step of simultaneously precipitating zinc and copper as components of a complex silicate gel through the intermixture of an aqueous solution of zinc and copper salts, in which the atomic ratio of zinc to copper is at least 1:10, with a silicate containing solution in which the silicate constitutes at least 10% of the electronegative components and in which the pH has been adjusted through the incorporation of an alkaline earth base and/or ammonia.

10. The composition prepared as in claim 9, wherein the alkaline earth metal is calcium.

11. A method of controlling fungus growths which includes the step of applying to the fungus bearing host a complex copper-zinc salt which is substantially insoluble in a medium of pH 6.0 and is substantially non-injurious to the host.

12. A method of killing fungi which comprises the step of applying thereto a copper-zinc-silica complex which is substantially insoluble in dilute acid, pH 6.0, and is substantially non-toxic to the horticultural host.

ALWYN C. SESSIONS.